US011343569B2

(12) United States Patent
Rechner et al.

(10) Patent No.: US 11,343,569 B2
(45) Date of Patent: May 24, 2022

(54) SYSTEM AND METHOD FOR CONTEXT AWARE DETECTION OF OBJECTIONABLE SPEECH IN VIDEO

(71) Applicant: International Business Machines Corporation, Armonk, NY (US)

(72) Inventors: Istvan Rechner, Budapest (HU); Attila Toth, Budapest (HU); Andras Balogh, Budapest (HU); Eszter Kotra, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/013,943

(22) Filed: Sep. 8, 2020

(65) Prior Publication Data

US 2020/0404373 A1    Dec. 24, 2020

Related U.S. Application Data

(63) Continuation of application No. 16/133,272, filed on Sep. 17, 2018, now Pat. No. 10,834,462.

(51) Int. Cl.
| | |
|---|---|
| *H04N 21/454* | (2011.01) |
| *H04N 21/439* | (2011.01) |
| *G06N 3/08* | (2006.01) |
| *G10L 15/26* | (2006.01) |
| *G06F 40/30* | (2020.01) |
| *G06F 40/242* | (2020.01) |
| *G06F 40/284* | (2020.01) |

(52) U.S. Cl.
CPC ......... *H04N 21/454* (2013.01); *G06F 40/242* (2020.01); *G06F 40/284* (2020.01); *G06F 40/30* (2020.01); *G06N 3/08* (2013.01); *G10L 15/26* (2013.01); *H04N 21/4396* (2013.01)

(58) Field of Classification Search
CPC .. H04N 21/454; H04N 21/4396; G06F 40/30; G06F 40/242; G06F 40/284; G06N 3/08; G10L 15/26
See application file for complete search history.

(56) References Cited

U.S. PATENT DOCUMENTS

| | | |
|---|---|---|
| 5,099,322 A | 3/1992 | Gove |
| 6,519,770 B2 | 2/2003 | Ford |
| 6,567,778 B1 | 5/2003 | Chao Chang et al. |
| 8,868,408 B2 | 10/2014 | Spears |

(Continued)

OTHER PUBLICATIONS

Barakat, M.S.; Ritz, C.H.; Stirling, D.A.; "Detecting offensive user video blogs: An adaptive keyword spotting approach," 2012 International Conference on Audio, Language and Image Processing, pp. 419-425, Jul. 16-18, 2012.

(Continued)

*Primary Examiner* — Anthony Bantamoi
(74) *Attorney, Agent, or Firm* — Troutman Pepper Hamilton Sanders LLP

(57) ABSTRACT

Embodiments provide a system and method for filtering speech in a video. Speech in video may contain objectionable or profane words that need to be filtered. To ascertain whether a word or phrase is objectionable, the contextual information from surrounding words and the contextual information from detected objects and scenes in the video are used. Unwanted words may be filtered or collected and presented to the user.

20 Claims, 3 Drawing Sheets

(56) References Cited

U.S. PATENT DOCUMENTS

| | | |
|---|---|---|
| 9,245,278 B2 | 1/2016 | Orsini et al. |
| 9,799,347 B2 | 10/2017 | Kulavik et al. |
| 2005/0086705 A1* | 4/2005 | Jarman .................. H04N 7/16 |
| 2009/0049467 A1 | 2/2009 | Robson et al. |
| 2009/0094187 A1 | 4/2009 | Miyaki |
| 2010/0194979 A1* | 8/2010 | Blumenscein ........... H04N 7/00 |
| 2011/0249867 A1 | 10/2011 | Haas et al. |
| 2013/0346144 A1* | 12/2013 | Ferren .................... G06Q 30/02 |
| 2014/0040932 A1 | 2/2014 | Gates, III et al. |
| 2018/0018827 A1 | 1/2018 | Stafford et al. |

OTHER PUBLICATIONS

Sood, S.O; Antin, J.; Churchill, Elizabeth F., "Using Crowdsourching to Improve Profanity Detection," Association for the Advancement of Artificial Intelligence, pp. 69-74, 2012.

Peltonen, Vesa; Tuomi, Juha; Klapuri, Anssi, "Computational Auditory Scene Recognition," Tampere University of Technology Signal Processing Laboratory.

Perttunen, Mikko; Van Kleek, Max; Lassila, Ora; Riekki, Jukka, "Auditory Context Recognition Using SVMs," Deparlment of Electrical and Information Engineering, University of Oulu; Mit Csail; Nokia Research Center Cambridge.

* cited by examiner

SYSTEM AND METHOD FOR CONTEXT AWARE DETECTION OF OBJECTIONABLE SPEECH IN VIDEO

CROSS REFERENCE TO RELATED APPLICATIONS

This application is a continuation of U.S. patent application Ser. No. 16/133,272, filed on Sep. 17, 2018, the entire contents of which are hereby incorporated by reference herein.

BACKGROUND

The present application relates generally to a system and method for filtering speech in a video.

Speech may include words or phrases that are profane, irreverent, vulgar, obscene, or otherwise objectionable. The definition of what is objectionable differs from culture to culture, from language to language, between communities within a single culture, and also between individuals of the same community. Furthermore, words or phrases that are objectionable in one context may be appropriate in another context. Polysemantic words are particular troublesome because of their multiple meanings. For example, the term "bloody" in British English is considered an expletive that is objectionable. However, the term "bloody" is also used to describe bleeding such as that incurred by American baseball pitcher Curt Schilling on his ankle during Game 6 of the 2004 American League Championship Series—an incident that is commonly referred to as the "bloody sock." A reference to Curt Schilling's bloody sock is not considered profane or otherwise objectionable. Thus, detecting objectionable speech is not an easy task due to the variance in culture, language, community, individuals, and context.

In the past, speech filtration systems relied on lists of profane words maintained in "dictionaries" to compare against the speech being filtered. These lists tend to be over inclusive and filter out all uses of select words. This is particularly troublesome for polysemantic words, such as "bloody." In the example above, "bloody" would be filtered when referring to Curt Schilling's sock even though in that context it is not considered profane. Filtering "bloody" from the phrase "bloody sock" would be problematic as it removes a key piece of valid unobjectionable information that results in a loss of meaning to the phrase.

Speech in video presents an opportunity for more accurate filtering of objectionable words or phrases because the video provides additional context in the form of visual data in the scene in which the speech occurs. In the bloody sock example, images of a bloody sock in a baseball game may indicate that "bloody" is not being used as a profane expletive. Conventional dictionary based systems do not use the video content to determine the context of the speech. Another problem with conventional dictionary systems is that they are relatively inflexible because they depend on a user updating the dictionary database of words. More flexible and contextually aware speech recognition systems for speech in video are beneficial, as they provide more accurate filtering of objectionable speech that mutes content while at the same time permitting valid speech to be conveyed to the viewer/listener.

SUMMARY

Embodiments can provide a computer implemented method in a data processing system comprising a processor and a memory comprising instructions, which are executed by the processor to cause the processor implement speech filtration of a video, the method comprising converting speech in a scene of the video to text, wherein the text comprises words; evaluating the text to determine candidate words to filter; for each identified candidate word: determining if there is a non-objectionable meaning to the identified candidate word, and if there are no non-objectionable meanings to the identified candidate word, then filtering the candidate word from the speech; for each candidate word having at least one non-objectionable meaning: identifying surrounding words in the scene, calculating a first context for the candidate word using semantic analysis of the surrounding words, receiving a list of objects in the scene, calculating a second context for the candidate word using semantic analysis of the list of objects, determining if the candidate word is objectionable based on the first and second contexts, and if the candidate word is objectionable, then filtering the candidate word from the speech.

Embodiments can further provide a method further comprising wherein the step of evaluating the text to determine candidate words to filter comprises, using a pre-filter to exclude words from being designated as candidate words.

Embodiments can further provide a method further comprising removing punctuation from the text.

Embodiments can further provide a method further comprising wherein the step of evaluating the text to determine candidate words to filter comprises, determining the language of the text, selecting a dictionary of objectionable words based on the language of the text, and comparing each word in the text to the words in the selected dictionary.

Embodiments can further provide a method further comprising wherein the scene comprises a portion of the video having a start time and a stop time.

Embodiments can further provide a method further comprising wherein the step of identifying surrounding words comprises identifying a range of words before and after the candidate word that are within the scene.

Embodiments can further provide a method further comprising wherein the semantic analysis comprises a deep learning analysis.

Embodiments can further provide a method further comprising wherein the objects in the scene comprise a textual representation of a visual element.

Embodiments can further provide a method further comprising wherein filtering comprises muting the speech.

Embodiments can further provide a method further comprising for each objectionable candidate word, adding the candidate word to the dictionary.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a persistent user identification provision processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
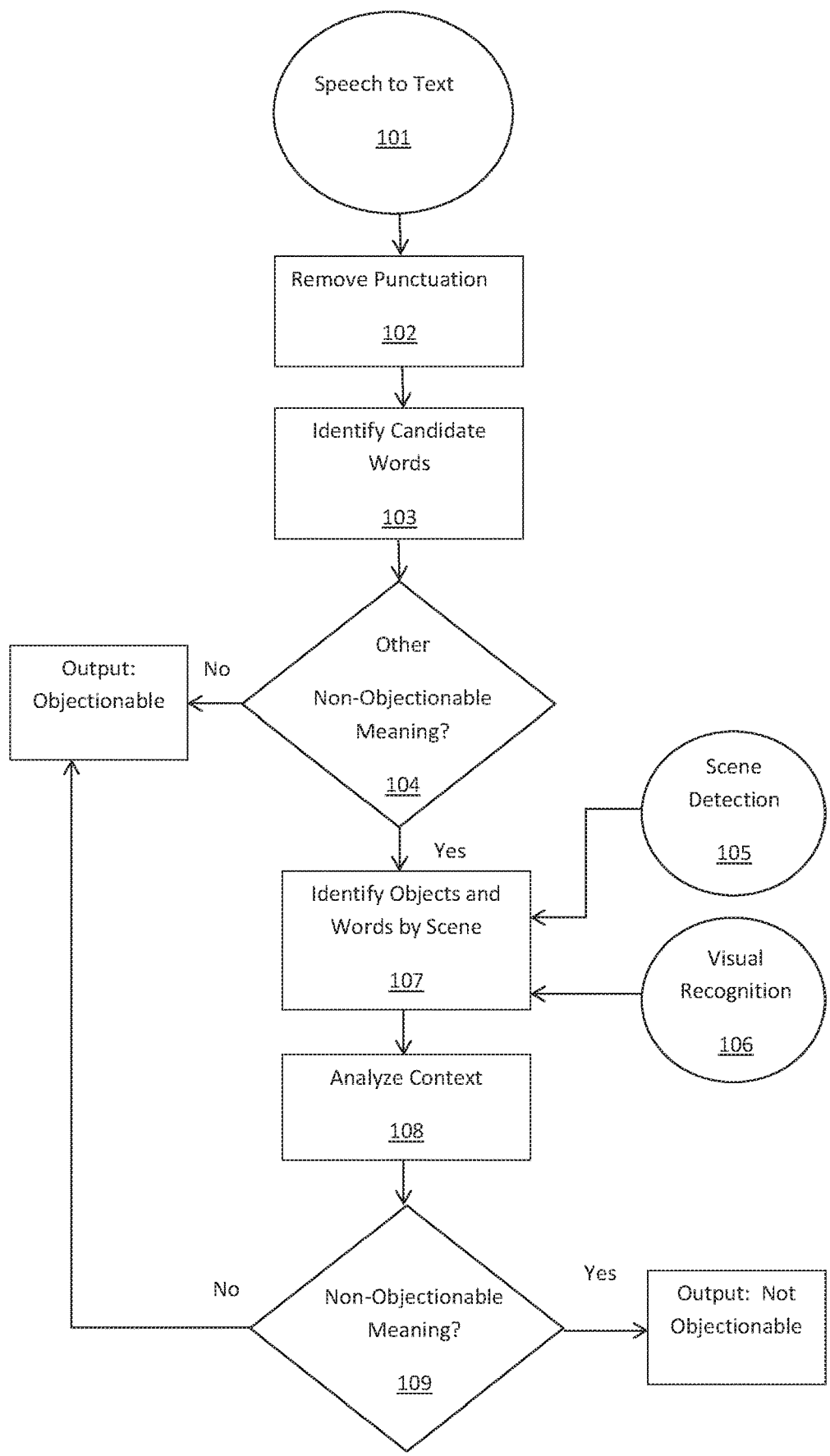
FIG. 1 depicts a schematic diagram of one illustrative embodiment to filter speech in a video.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention may be implemented on a cognitive system. As an overview, a cognitive system is a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with high accuracy and resilience on a large scale. IBM Watson™ is an example of one such cognitive system which can analyze the context of speech and filter objectionable portions with human-like accuracy at speeds far faster than human beings and on a much larger scale. In general, such cognitive systems are able to perform the following functions:

1. Navigate the complexities of human language and understanding
2. Ingest and process vast amounts of structured and unstructured data
3. Generate and evaluate hypotheses
4. Weigh and evaluate responses that are based only on relevant evidence
5. Provide situation-specific advice, insights, and guidance
6. Improve knowledge and learn with each iteration and interaction through machine learning processes
7. Enable decision making at the point of impact (contextual guidance)
8. Scale in proportion to the task
9. Deduce various language specific or agnostic attributes from natural language
10. High degree of relevant recollection from data points (images, text, voice)
11. Predict and sense with situation awareness that mimic human cognition based on experiences.

FIG. 1 depicts a schematic diagram of one illustrative embodiment of speech filtration system for speech within a video using a cognitive system. In some embodiments, the cognitive system may be the IBM Watson™ cognitive system available from International Business Machines Corporation of Armonk, N.Y., which is augmented with the mechanisms of the illustrative embodiments described hereafter.

The term "video" as used herein refers to visual images associated with audio, such as a television broadcast, movie, or other visual media in either digital or analog format. While typically, visual images are moving, they can also consist of still pictures with audio. A video may be broken into smaller segments called "scenes" either manually or with a scene detection algorithm.

In an embodiment, the audio portion of a video is converted to text. One such method for converting speech to text is that provided by IBM Watson™ Speech to Text. The speech to text conversion, in an embodiment, receives as an input a video comprising audio and visual elements. A speech recognition module takes the audio signal as an input and produces a speech transcript in the form of text. The text can be formatted in one or more different formats for consumption. For instance, the text file can be a plain text ASCII file, a rich text file, or other suitable format for examining the speech from the video.

In an embodiment, the audio portion of a video can be extracted from the closed caption text using one of several available products. An optical character recognition ("OCR") device may be used to obtain any text that appears in the video but is not spoken.

In an embodiment, the text file resulting from the speech to text conversion process includes a timestamp identifying the start and stop time in the video for the occurrence of the word. The time stamp can be provided as part of the speech to text transcription. In other embodiments, the time stamp for each word is obtained separately from the speech to text conversion process.

Referring now to FIG. 1, after the output of the speech to text conversion in step 101 is received, all punctuation is removed in step 102 from the text file. Removing the punctuation simplifies the processing of the text file.

The language of the text may also be determined. In one embodiment, the language is determined by examining the text for specific character patterns and frequencies. Languages typically have unique profiles associated with the frequency distribution of n-grams of text. In one embodiment, a set of profiles for known languages is maintained in a database. The text file is examined to calculate the frequency distribution of the n-grams of the text file in order to determine a profile for the text file. This determined profile is then compared against the known set of profiles to determine the language profile that is most similar to the profile of the text file. The degree of accuracy in the comparison can be adjusted to increase the accuracy of detecting the correct language, but requiring higher accuracy will more likely result in the inability to determine the language. If a language for the text file cannot be determined, then indication of such is provided. Furthermore, the language can be manually selected.

Referring back to FIG. 1, after the punctuation of the text file is removed at step 102, a pre-filter may optionally be applied to exclude certain words in the text file from being analyzed and potentially filtered as objectionable. Excluding certain words from the filtration process is advantageous in special-use cases in which a word that may likely be objectionable should not be filtered. In other embodiments, it may be advantageous to exclude certain words from the filtration process based on the language of the speech. Words that are to be pre-filtered can be designated in a dictionary and compared against the words from the text file. The comparison process tries to match any of the words in the text file to any of the words in the dictionary. The comparison process can match exact words or words that are similar such as words with similar verb tense and spelling. The pre-filter dictionary may be updated through any number of means, including automatic updates and manual entries. Furthermore, the pre-filter dictionary may be selected based on the detected language of the text. More than one dictionary can be used to pre-filter the text.

At step 103, all words in the text that have not been pre-filtered, if a pre-filter was applied, are then processed to determine if they are objectionable. In an embodiment, this process compares each word to a list of words in a dictionary. This dictionary may be logically or physically separate from the dictionary used for pre-filtering. The dictionary may comprise a list of objectionable words that have no non-objectionable meaning and objectionable words that have non-objectionable meaning(s). The comparison process can match exact words or words that are similar such as words with similar verb tense and spelling. A list of words that match at least one word in the dictionary is stored in memory as a candidate word to be filtered as objectionable. Candidate words may be displayed to a user. In an embodiment, a user may be able to select a candidate word and re-classify it as non-objectionable. Conversely, words in the text that were not identified as candidate words may also be manually selected as objectionable.

At step 104, each candidate word is examined to determine if it has at least one non-objectionable meaning. Words that have no non-objectionable meaning(s) are marked as objectionable and filtered. Objectionable words may be filtered in any number of ways, including being muted, garbled, or replaced with a non-objectionable alternative such as a "voiced-over" that results in the listener hearing a non-objectionable alternative in place of the objectionable term (e.g., "darn" instead of "damn").

If the candidate word has at least one non-objectionable meaning, then the process proceeds to step 107 to determine the textual context and, optionally, a video context in which the candidate word appears. The textual context refers to a first context for the candidate word determined by analysis of words that surround the candidate word in the same scene of the video. The video context refers to a second context for the candidate word determined by analysis of objects in the same scene of the video. In an embodiment, either or both of the textual and visual contexts can be used in the analysis of candidate words. To save resources, only one contextual context (either textual or visual) can be used.

In an embodiment in which both textual and visual contexts are used to determine if the candidate word is objectionable, at step 107, a scene detection algorithm 105 provides scene segmentation data that comprises the start and stop time of the scene. The scene detection algorithm 105 can divide a video into scenes in a number of ways. In one embodiment, user input selects the scene detection method. In another embodiment, scene detection is an automated process that is based on one or more factors such as time or objects in the scene. For example, scenes in a video may be determined by time (e.g., a 60 minute video may be equally divided into four 15 minute scenes). As another example, scenes may be designated according to a number of words that are spoken, such that a scene may comprise every ten words in a video. In another example, scenes may be defined by the visual objects present in the video. In this example, a scene would comprise a portion of video in which certain objects remain in view (e.g., table in a restaurant, chairs in the restaurant, waitress, and diners). When objects in the video change (e.g., a beach becomes visible), that could indicate the beginning of a new scene. In other examples, scenes may be defined by a user that marks the beginning and end of each scene in the video. A video may comprise a single scene. Certain visual productions such as movies or television shows may indicate the beginning and end of each scene through visual or other markers embedded within the video. In another embodiment, a scene can correspond to a chapter, such as a chapter in a book. Combinations of the above examples for defining a scene using scene detection algorithm 105 could also be used as well as many others. Regardless of the specific scene detection algorithm 105 used, the result includes a start and stop time within the video. In one embodiment, all scenes are optionally indexed in memory according to timestamps for efficient access.

At step 107, surrounding words that occur in the same scene as the candidate word are identified in order to determine the textual context of the candidate word. Surrounding words are those words that occur before and/or after the candidate word in the same scene. For example, if a candidate word is spoken between the 15:30 mark (i.e., fifteen minute and thirty second mark) and 15:45 mark on the video, then based on this timestamp, a scene for this candidate word must include 15:30 to 15:45, such as a scene beginning at 12:00 and ending at 21:40.

In one embodiment, a constant number range is used to determine surrounding words. The selected range for surrounding words can effect accuracy. For instance, if a very small range (or no range at all) is used, then there will be very few words to analyze, and it will be more difficult to determine the correct context with few (or no) data points. On the other hand, if an extremely long range of surrounding words is used, it is very likely that not all of the words will be in the same scene. In one example, a seven-word range is capable of providing a good balance between both extremes. The range of the surrounding words can vary based on the scenes in the video, use case, content, and language identified. In one embodiment, the surrounding words comprise nouns, adjectives, adverbs, and other descriptive terms, but prepositions, articles, and other non-descriptive terms are omitted. In one embodiment, a user is prompted to enter the range of surrounding terms to examine.

Continuing with the above example having a seven word range, at step 107, seven words that are before and after the candidate term and that are also in the scene beginning at 12:00 and ending at 21:40 are selected. If there are less than seven words (or no words) that are before or after the candidate term in the scene, then the maximum number of terms available in the scene will be selected. No terms outside of the scene in which the candidate word appears will be selected.

At step 108, semantic analysis is performed on the surrounding words to determine a textual context for the candidate word. A variety of algorithms are contemplated to determine this first context. One exemplary embodiment can use a rule or regular-expression based technique that uses grammatical parsing and looks for regular expressions to identify patterns in the surrounding terms and match the patterns to known contexts.

In another embodiment, a multilayer dictionary can be used in which the first layer identifies objectionable words (and phrases), and the second layer identifies words (and phrases) that indicate non-objectionable use of the identified objectionable word (or phrase). For example, the word "high" might be considered objectionable as it could refer to drug use. In the multilayer dictionary, words and phrases associated with "high" that indicate acceptable use might include "building, tall, sky, up in the air, and floor." Thus, if the surrounding words contained one or more of "building, tall, sky, up in the air, and floor," then the word "high" would not be considered objectionable.

In yet another embodiment, a machine-learning approach can be used. In a machine-learning or deep learning analysis, the computer is trained with massive data sets to "learn" the relationship between words such that a semantic understanding of context is gained. In the deep learning analysis, the trained computer evaluates the surrounding words to determine a semantic relationship between them that is used to identify a textual context for the scene. For example, in the deep learning semantic analysis, one embodiment for detecting a medical context would be to first annotate and identify words associated with medicine, such as doctor, medical, prescription, disease, and certain key relationships such as "feeling ill" into a dictionary or table associated with "medicine." Then, the surrounding words are compared to the words associated with medicine as well as numerous other contexts. A confidence score can be determined that indicates how likely the surrounding words indicate that the context is associated with one or more contexts. Based on the confidence score, the deep learning semantic analysis can identify the most likely context of the surrounding words.

At step 108, a second context (visual context) is determined based on visual cues within the scene. The determination of the visual context begins at step 107 in which input about the scene is determined from visual recognition 106. Visual recognition 106 can be provided by IBM's Watson™ Visual Recognition, which identifies objects in the scene. Objects in the scene can include people, animals, background (e.g., clouds, sky, trees, etc.), and/or inanimate objects such as tables, buildings, clouds, etc. Visual recognition 106 provides a textual representation of the scene in the video such as a text file listing, for example, a "tree" if there is a tree in the scene. As discussed above, the scene detection 105 is defined with a start and stop time, and the objects detected in the scene are each associated with a time stamp such that only objects that appear within the scene are selected for the visual context.

At step 108, the objects in the scene of the video are analyzed to determine a visual context in which the candidate term(s) is spoken. As previously discussed with regard to the determination of the first context, a variety of algorithms are contemplated to determine the second context, including use of a rule or regular-expression based technique using grammatical parsing as well as deep learning semantic analysis approaches.

At step 109, if the textual and visual context of the candidate word indicates that the candidate word is used in a non-objectionable manner, then the candidate word is not filtered. In alternative embodiments, the textual context (or the visual context) can first be used to determine if there is a non-objectionable meaning, and if not, then use the visual context (or the textual context, if the visual context was used first) to determine if there is a non-objectionable meaning.

In one embodiment, the candidate word can be added to a dictionary of non-objectionable words. In another embodiment, the candidate word can be displayed to the user as a non-objectionable word. A user can manually filter the candidate word and/or designate it as objectionable. If the word is designated objectionable by the user, then this information can be used to train the neural network of the cognitive system regarding the semantic understanding of textual contexts so that future analysis will more accurately identify this textual context as objectionable.

Candidate words that are filtered because they are deemed objectionable can be added to the dictionary of objectionable words. Candidate words that are not filtered can be stored in memory and/or a dictionary.

In some embodiments, a user can evaluate the outcome of the inventive method and provide feedback that can be used to train the neural network in the cognitive system. For example, a candidate word that was filtered may not be objectionable in a certain context. The specifics of the context and the use of the word within that context can be input to the method to further train the neural network of the cognitive system. Likewise, a candidate word that was not filtered may still be objectionable, and specifics of the context and use of the term can be input to the cognitive system to further train the neural network.

Other contexts for filtering candidate words are also contemplated by the invention that can be used in addition to and/or instead of the textual and visual contexts taught above. For example, the auditory context, environment, and speaker could also be used. The auditory context takes into consideration, for example, the volume (or amplitude) of the spoken words such that loud words may indicate that a candidate word is being used in an objectionable manner. Syllables accented by the speaker can also give auditory context of the candidate word and the surrounding words. The environment provides additional clues as to the context of the speech. For example, a war zone or battle environment may tend to indicate that speech is more likely to be objectionable than speech that occurs in a nursery environment. Likewise, information about the speaker also provides additional information that can further indicate whether speech is objectionable or not. Speaker information can be specific (i.e., a person's name) or general (i.e., a doctor). For example, a doctor's use of a word may indicate that it is more likely used in a non-objectionable context. As another example, speech by a particular person, such as the President of the United States, may also provide additional context as to whether the speech is likely objectionable or not. Additional means to detect context can also be added either in parallel, sequentially, or in some other combination with the textual and visual contexts previously disclosed.

Figure 2:
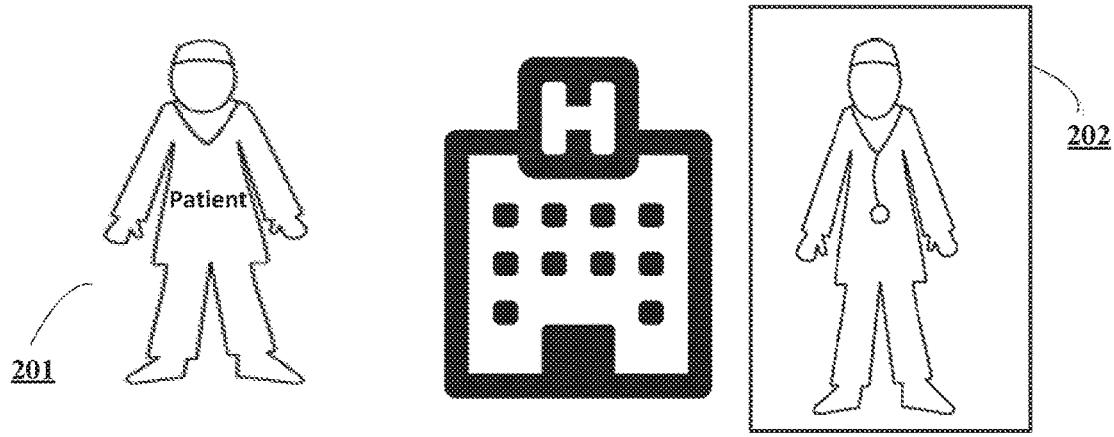
FIG. 2 depicts an example of filtering speech in a video.

FIG. 2 is an example of filtering speech in a video. In a video, scene 201 depicts two doctors discussing anal cancer. Anal is a word that may be considered objectionable. For example, certain television broadcasters may not want to air the word "anal" during certain times. However, in a medical context, it would be entirely accepted, and filtering it out would remove an important and useful component of the content rendering an unacceptable viewing experience.

In this example, speech in the scene is converted to text. The text file, in an embodiment, is broken out into "word, start time, end time" triplets. For example, a portion of the speech transcript 204 recites " . . . usually the symptom of anal cancer produces some . . . ." These words can be, for example, broken out into the following triplets:

text: usually; start_timestamp: 88:09; end_timestamp: 88:10 text: the; start_timestamp: 88:11; end_timestamp: 88:12 text: symptom; start_timestamp: 88:13; end_timestamp: 88:14 text: of; start_timestamp: 88:15; end_timestamp: 88:16 text: anal; start_timestamp: 88:17; end_timestamp: 88:18 text: cancer; start_timestamp: 88:19; end_timestamp: 88:20 text: produces; start_timestamp: 88:21; end_timestamp: 88:22 text: some; start_timestamp: 88:23; end_timestamp: 88:24

Any punctuation in the file is removed, and the text file is examined to determine if there are any objectionable words. In this example, "anal" 205 is objectionable, and it is marked as a candidate word. In this example, there is only one candidate word that is identified, but there could be multiple occurrences in a scene of the same word. Each of these instances might have different outcomes depending on the context (i.e., one instance might be filtered while the other instance might not be filtered).

The candidate word "anal" 205 is examined to determine if there are non-objectionable usages of this word. In this example, there are non-objectionable usages/meanings, and so the textual and visual context is determined. To determine the textual context, surrounding words 206 and 207 are examined using a deep learning semantic analysis process to determine a first context.

To determine the visual context, a visual recognition process provides a textual list of objects 203 in the scene. In this example, the image of the doctor 202 provides a number of these visual objects including the following: medical specialist, radiologist, doctor, hospital, medical building, and lab coat. To determine the visual context, visual objects 203 are examined using a deep learning semantic analysis process to determine a second context. In this example, based on the textual and visual contexts, the determination is made that candidate word "anal" 205 is not objectionable because it is being used in a medical context. Therefore, "anal" 205 is not filtered.

Advantages of the system and method include a more accurate filtration process of video speech to reduce the occurrence of false positives because both textual and video contexts are used to more accurately identify the context in which the speech occurs. Further advantages include the ability to teach the cognitive system to improve the deep learning semantic analysis.

Figure 3:
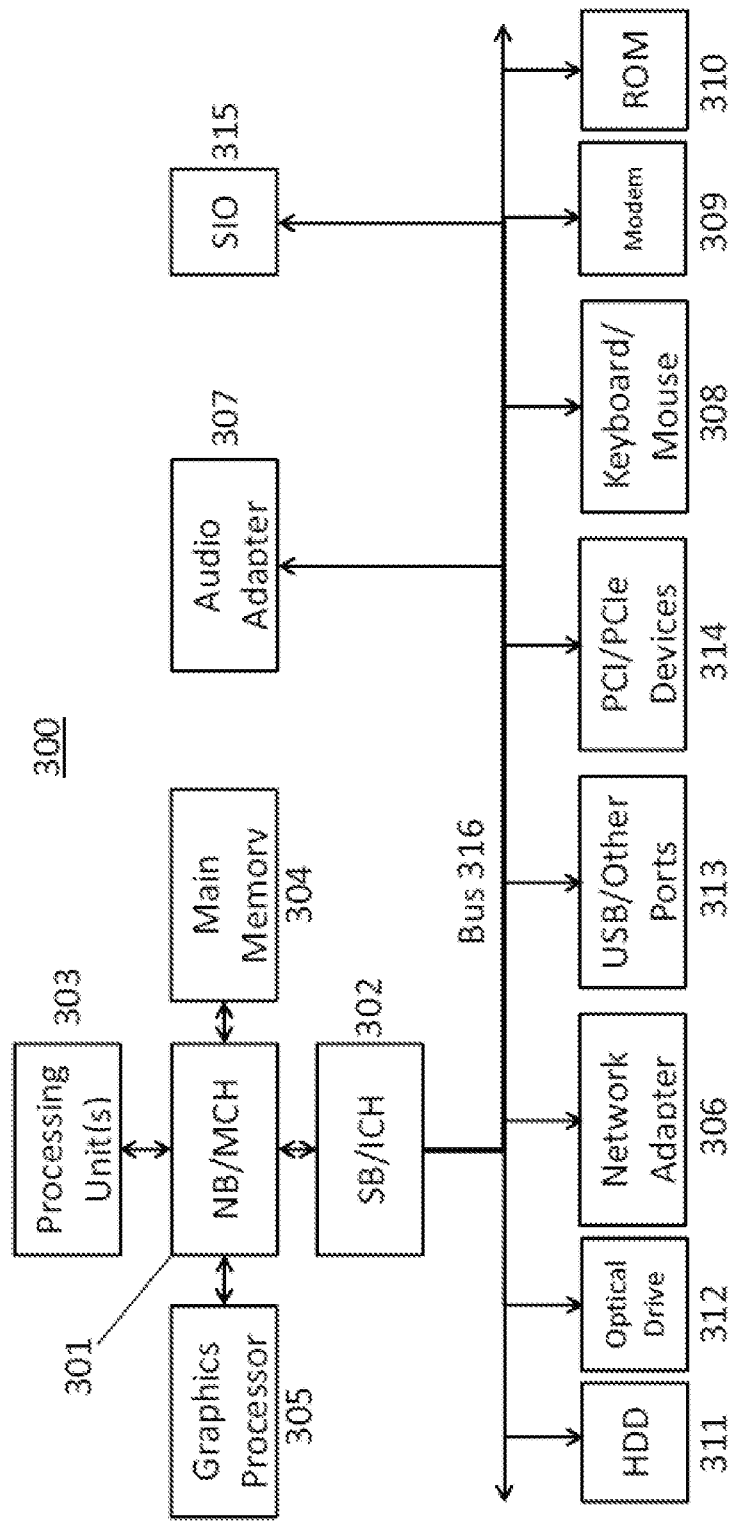
FIG. 3 is a block diagram of an example data processing system in which aspects of the illustrative embodiments may be implemented.

FIG. 3 is a block diagram of an example data processing system 300 in which aspects of the illustrative embodiments, such as the user agent, authenticator, and/or authentication server, can be implemented. Data processing system 300 is an example of a computer, such as a server or client, in which computer usable code or instructions implementing the process for illustrative embodiments of the present invention are located. In one embodiment, FIG. 3 represents a server computing device, such as a server, which implements the network tracking system described herein.

In the depicted example, data processing system 300 can employ a hub architecture including a north bridge and memory controller hub (NB/MCH) 301 and south bridge and input/output (I/O) controller hub (SB/ICH) 302. Processing unit 303, main memory 304, and graphics processor 305 can be connected to the NB/MCH 301. Graphics processor 305 can be connected to the NB/MCH through an accelerated graphics port (AGP).

In the depicted example, the network adapter 306 connects to the SB/ICH 302. The audio adapter 307, keyboard and mouse adapter 308, modem 309, read only memory (ROM) 310, hard disk drive (HDD) 311, optical drive (CD or DVD) 312, universal serial bus (USB) ports and other communication ports 313, and the PCI/PCIe devices 314 can connect to the SB/ICH 302 through bus system 316. PCI/PCIe devices 314 may include Ethernet adapters, add-in cards, and PC cards for notebook computers. ROM 310 may be, for example, a flash basic input/output system (BIOS). The HDD 311 and optical drive 312 can use an integrated drive electronics (IDE) or serial advanced technology attachment (SATA) interface. The super I/O (SIO) device 315 can be connected to the SB/ICH.

An operating system can run on processing unit 303. The operating system can coordinate and provide control of various components within the data processing system 300. As a client, the operating system can be a commercially available operating system. An object-oriented programming system, such as the Java™ programming system, may run in conjunction with the operating system and provide calls to the operating system from the object-oriented programs or applications executing on the data processing system 300. As a server, the data processing system 300 can be an IBM® eServer™ System P® running the Advanced Interactive Executive operating system or the Linux operating system. The data processing system 300 can be a symmetric multiprocessor (SMP) system that can include a plurality of processors in the processing unit 303. Alternatively, a single processor system may be employed.

Instructions for the operating system, the object-oriented programming system, and applications or programs are located on storage devices, such as the HDD 311, and are loaded into the main memory 304 for execution by the processing unit 303. The processes for embodiments of the network tracking system can be performed by the processing unit 303 using computer usable program code, which can be located in a memory such as, for example, main memory 304, ROM 310, or in one or more peripheral devices.

A bus system 316 can be comprised of one or more busses. The bus system 316 can be implemented using any type of communication fabric or architecture that can provide for a transfer of data between different components or devices attached to the fabric or architecture. A communication unit such as the modem 309 or network adapter 306 can include one or more devices that can be used to transmit and receive data.

Those of ordinary skill in the art will appreciate that the hardware depicted in FIG. 3 may vary depending on the implementation. Other internal hardware or peripheral devices, such as flash memory, equivalent non-volatile memory, or optical disk drives may be used in addition to or in place of the hardware depicted. Moreover, the data processing system 300 can take the form of any of a number of different data processing systems, including but not limited to, client computing devices, server computing devices, tablet computers, laptop computers, telephone or other communication devices, personal digital assistants, and the like. Essentially, data processing system 300 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement speech filtration of a video, the method comprising:
   segmenting a video into a scene, wherein segmenting the video comprises:
      identifying an object in the video that is indicative of the scene,
      identifying a first appearance of the object in the video,
      identifying a last appearance of the object in the video, wherein the object is continuously in the video between the first appearance and the last appearance, wherein the scene begins upon the first appearance and ends upon the last appearance;
   converting speech in the scene of the video to text, wherein the text comprises words;
   determining that a word in the text of the scene has an objectionable meaning and a non-objectionable meaning, wherein the word is a candidate word; and
   identifying surrounding words in the scene;
   calculating a first context for the candidate word using semantic analysis of the surrounding words;
   receiving a list of objects in the scene;
   calculating a second context for the candidate word using semantic analysis of the list of objects;
   determining that the candidate word is objectionable based on the first and second contexts; and
   filtering the candidate word from the speech.

2. The method as recited in claim 1, wherein the step of evaluating the text to determine candidate words to filter comprises:
   using a pre-filter to exclude words from being designated as candidate words.

3. The method as recited in claim 1, further comprising:
   removing punctuation from the text.

4. The method as recited in claim 1, wherein determining that a word in the text has an objectionable meaning and a non-objectionable meaning comprises:
   determining the language of the text;
   selecting a dictionary of objectionable words based on the language of the text; and
   comparing each word in the text to the words in the selected dictionary.

5. The method as recited in claim 1, wherein the scene comprises a portion of the video having a start time and a stop time.

6. The method as recited in claim 1, wherein the step of identifying surrounding words in the scene comprises:
   identifying a range of words before and after the candidate word that are within the scene.

7. The method as recited in claim 4, wherein the semantic analysis comprises:
   a deep learning analysis.

8. The method as recited in claim 1, wherein the objects in the scene comprise a textual representation of a visual element.

9. The method as recited in claim 1, wherein filtering comprises:
   muting the speech.

10. The method as recited in claim 4, further comprising:
    for each objectionable candidate word, adding the candidate word to the dictionary.

11. A computer program product for speech filtration of a video, the computer program product comprising a computer readable storage medium having program instructions embodied therewith, the program instructions executable by a processor to cause the processor to:
    segment a video into a scene, wherein segmenting the video comprises:
       identifying an object in the video that is indicative of the scene,
       identifying a first appearance of the object in the video,
       identifying a last appearance of the object in the video, wherein the object is continuously in the video between the first appearance and the last appearance, wherein the scene begins upon the first appearance and ends upon the last appearance;
    convert speech in the scene of the video to text, wherein the text comprises words;
    determine that a word in the text of the scene has an objectionable meaning and a non-objectionable meaning, wherein the word is a candidate word; and
    identify surrounding words in the scene;
    calculate a first context for the candidate word using semantic analysis of the surrounding words;
    receive a list of objects in the scene;
    calculate a second context for the candidate word using semantic analysis of the list of objects;
    determine that the candidate word is objectionable based on the first and second contexts; and
    then filter the candidate word from the speech.

12. The computer program product as recited in claim 11, the processor further configured to:
    remove punctuation from the text.

13. The computer program product as recited in claim 11, wherein the determine that a word in the text has an objectionable meaning and a non-objectionable meaning comprises:
    determine the language of the text;
    select a dictionary of objectionable words based on the language of the text; and
    compare each word in the text to the words in the selected dictionary.

14. The computer program product as recited in claim 11, wherein the scene comprises a portion of the video having a start time and a stop time.

15. The computer program product as recited in claim 11, wherein the program instructions to cause the processor to identify surrounding words further comprise:

identify seven words before and after the candidate word that are within the scene.

16. The computer program product as recited in claim 13, wherein the semantic analysis comprises:
a deep learning analysis.

17. The computer program product as recited in claim 11, wherein the objects in the scene comprise a textual representation of a visual element.

18. The computer program product as recited in claim 11, wherein the program instructions to cause the processor to filter the candidate word from the speech further comprises:
mute the speech.

19. The computer program product as recited in claim 13, the processor further configured to:
for each objectionable candidate word, add the candidate word to the dictionary.

20. A system for providing speech filtration of a video, comprising a processor configured to:
segment a video into a scene, wherein segmenting the video comprises:
identifying an object in the video that is indicative of the scene,
identifying a first appearance of the object in the video,
identifying a last appearance of the object in the video, wherein the object is continuously in the video between the first appearance and the last appearance, wherein the scene begins upon the first appearance and ends upon the last appearance;
convert speech in the scene of the video to text, wherein the text comprises words;
determine that a word in the text of the scene has an objectionable meaning and a non-objectionable meaning, wherein the word is a candidate word; and
identify surrounding words in the scene;
calculate a first context for the candidate word using semantic analysis of the surrounding words;
receive a list of objects in the scene;
calculate a second context for the candidate word using semantic analysis of the list of objects;
determine that the candidate word is objectionable based on the first and second contexts; and
filter the candidate word from the speech.

\* \* \* \* \*